United States Patent [19]

Lake

[11] 4,105,248
[45] Aug. 8, 1978

[54] SAFETY WINDSHIELD

[75] Inventor: Timothy R. Lake, Walnut Creek, Calif.

[73] Assignee: The Raymond Lee Organization, Inc., New York, N.Y.

[21] Appl. No.: 700,869

[22] Filed: Jun. 29, 1976

[51] Int. Cl.² ............................................. B60J 1/20
[52] U.S. Cl. .............................. 296/84 H; 15/250.22; 239/284 R
[58] Field of Search .......................... 296/84 H, 84 G; 15/250.22; 239/284

[56] References Cited

U.S. PATENT DOCUMENTS

| 1,201,916 | 10/1916 | Back | 296/84 H |
| 2,594,867 | 4/1952 | Carmona | 296/84 H |

FOREIGN PATENT DOCUMENTS

| 1,029,995 | 3/1953 | France | 296/84 H |
| 1,258,079 | 2/1961 | France | 296/84 H |

*Primary Examiner*—Philip Goodman
*Attorney, Agent, or Firm*—Howard I. Podell

[57] ABSTRACT

A windshield formed of a continuous sheet of flexible plastic mounted about a pair of rollers, each rotatably fixed in an opposed side pillar of the windshield frame. A roller is linked to a motor for rotating the windshield about both rollers, with a fixed wiper blade mounted to the exterior of the windshield for continuously wiping the windshield in motion. The edges of the windshield are guided by sealing gaskets mounted in the top and bottom of the windshield frame.

1 Claim, 3 Drawing Figures

SAFETY WINDSHIELD

SUMMARY OF THE INVENTION

My invention is a windshield formed of a continuous sheet of flexible plastic mounted about a pair of rollers, each rotatably fixed in an opposed side pillar of the windshield frame. A roller is linked to a motor for rotating the windshield about both rollers, with a fixed wiper blade mounted to the exterior of the windshield for continuously wiping the windshield in motion. The edges of the windshield are guided by sealing gaskets mounted in the top and bottom of the windshield frame.

BRIEF DESCRIPTION OF THE DRAWINGS:

The objects and features of the invention may be understood with reference to the following detailed description of an illustrative embodiment of the invention, taken together with the accompanying drawings in which.

Figure 1:
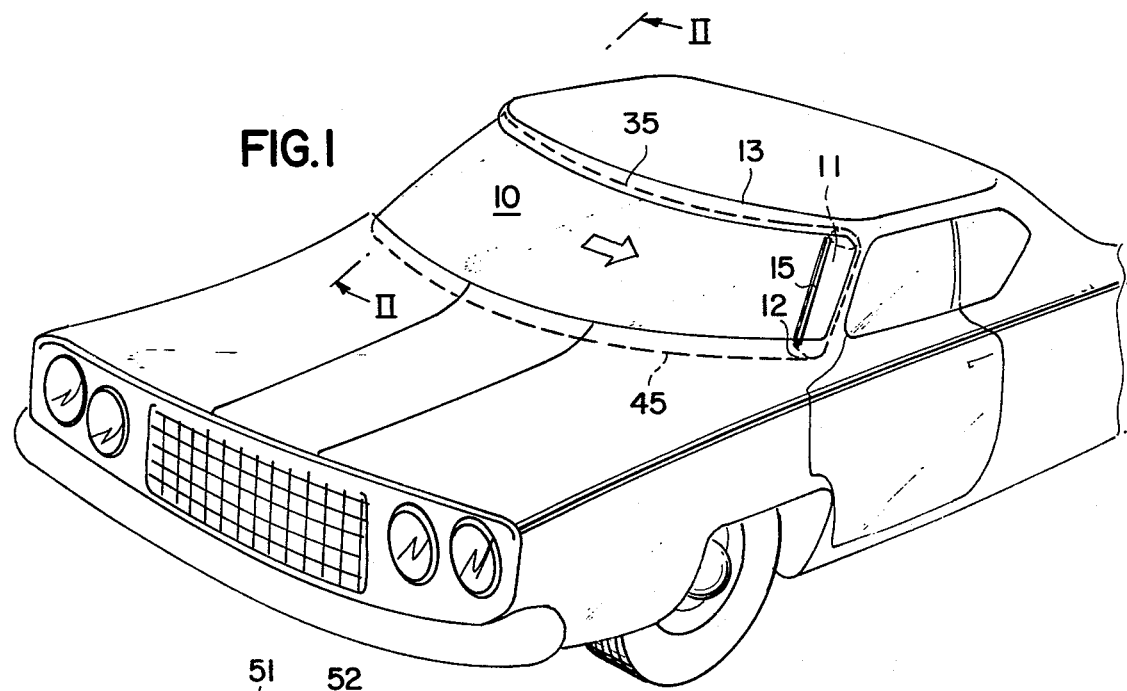
FIG. 1 is a perspective view of the invention installed.
Figure 2:
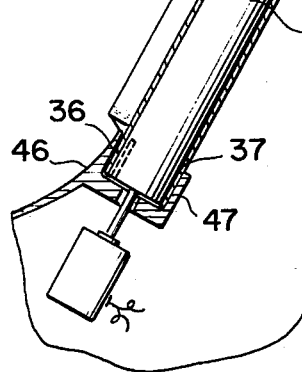
FIG. 2 is a sectional view of the invention, taken along line II-II of FIG. 1.
Figure 3:
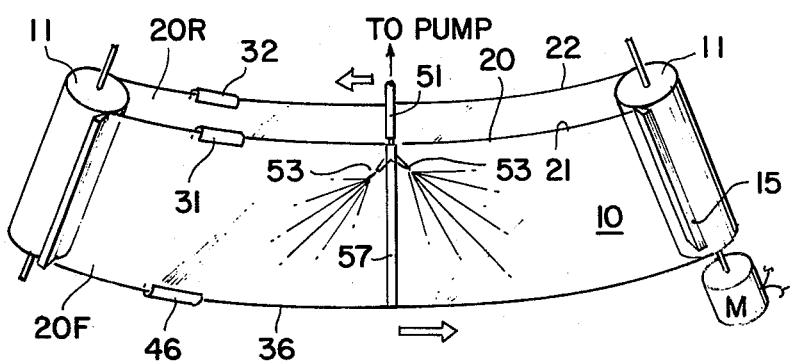
FIG. 3 is a schematic view of the invention.

DESCRIPTION OF THE PREFERRED EMBODIMENT:

Turning now descriptively to the drawings, in which similar reference characters denote similar elements throughout the several views, FIGS. 1-3 illustrate the safety windshield 10 which is formed of a continuous length of flexible transparent plastic sheet 20 such as Lexan plastic wound in a closed loop about two vertical spaced rollers 11, each roller being concealed in a side pillar 12 of the windshield frame 13. A brush or wiper blade 15 is fixed to the pillar frame adjacent each roller 11 for wiping the sheet 20 as it is wound about or off the respective roller 11.

The top edges 21 and 22 of the forward sheet 20F and rear sheet 20R are slidably enclosed by gaskets 31 and 32 respectively each mounted in the top rim 35 of the windshield frame 13, with the bottom edges 36 and 37 of the sheets 20F and 20R similarly slidably enclosed by gaskets 46 and 47 respectively in the bottom rim 45 of the windshield frame 13 so that forward sheet 20F lies generally parallel to rear sheet 20R.

A pump P is joined by tubing from a supply of washer fluid through a tube 51 mounted in the vehicle roof 52 to nozzles 53 mounted about a fixed wiper or scraper bar 57 located along a vertical axis externally about the mid-section of the forward sheet 20F to wash and wipe the forward sheet 20F as it is drawn horizontally past wiper blade 57 about rollers 11.

A motor M is linked to a roller 11 for powered rotation of the roller and the windshield sheet 20 about both rollers 11.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A windshield for a vehicle formed of a continuous sheet of transparent flexible plastic wound in a closed loop about a pair of spaced rollers, in which
   one of said roller is fitted with power means to rotate the roller, and in which
   the edges of the sheet are enclosed by flexible gaskets in a frame bounding the windshield, with
   a fixed wiper blade mounted externally to the frame of the windshield and located to wipe the external surface of the forward sheet of the windshield sheet, as the sheet is wound by the rollers, said wiper blade and said rollers each mounted along substantially vertical axes, with said wiper blade located externally about the mid-section of the windshield sheet, so as to wipe the forward sheet of the windshield as it is drawn past the wiper blade, together with
   washer pump and spray means associated with said wiper blade to wash the forward sheet as it is drawn past the wiper blade.

* * * * *